(12) United States Patent
Guimaraes et al.

(10) Patent No.: US 12,487,905 B1
(45) Date of Patent: Dec. 2, 2025

(54) USER INTERFACE FOR FORMAL VERIFICATION OF COMPUTER INSTRUCTIONS FOR COMPATIBILITY WITH A COMPILER ARCHITECTURE

(71) Applicant: Cadence Design Systems, Inc., San Jose, CA (US)

(72) Inventors: Breno Rodrigues Guimaraes, Belo Horizonte (BR); Habeeb Farah, San Jose, CA (US); Andreas Tiemeyer, San Jose, CA (US); Vaibhav Mittal, Whitefield (IN)

(73) Assignee: Cadence Design Systems, Inc., San Jose, CA (US)

( * ) Notice: Subject to any disclaimer, the term of this patent is extended or adjusted under 35 U.S.C. 154(b) by 183 days.

(21) Appl. No.: 18/079,775

(22) Filed: Dec. 12, 2022

(51) Int. Cl.
  *G06F 11/3604* (2025.01)
  *G06F 8/33* (2018.01)
  *G06F 8/41* (2018.01)

(52) U.S. Cl.
  CPC ............ *G06F 11/3608* (2013.01); *G06F 8/33* (2013.01); *G06F 8/41* (2013.01)

(58) Field of Classification Search
  CPC .. G06F 11/36; G06F 11/3604; G06F 11/3608; G06F 11/3688; G06F 11/3624; G06F 8/33; G06F 8/34; G06F 8/40; G06F 8/52; G06F 8/41; G06F 11/33; G06F 11/34; G06F 11/40; G06F 11/44; G06F 11/362; G06F 11/3636; G06F 11/3656
  See application file for complete search history.

(56) References Cited

U.S. PATENT DOCUMENTS

| | | | |
|---|---|---|---|
| 8,533,692 B2 * | 9/2013 | Crasovan | G06F 8/70 717/140 |
| 9,075,919 B2 * | 7/2015 | Sawano | G06F 11/3664 |
| 2010/0293527 A1 * | 11/2010 | Austin | G06F 8/34 717/113 |
| 2015/0007150 A1 * | 1/2015 | Anton | G06F 11/3466 717/132 |
| 2019/0213101 A1 * | 7/2019 | Raviv | G06F 8/41 |
| 2023/0305950 A1 * | 9/2023 | Li | G06F 11/3688 |

OTHER PUBLICATIONS

Decker, N., Leucker, M., Thoma, D. (2013). jUnitRV—Adding Runtime Verification to jUnit. In: Brat, G., Rungta, N., Venet, A. (eds) NASA Formal Methods. NFM 2013. Lecture Notes in Computer Science, vol. 7871. Springer, Berlin, Heidelberg. https://doi.org/10.1007/978-3-642-38088-4_34 (Year: 2013).*

* cited by examiner

*Primary Examiner* — Geoffrey R St Leger
(74) *Attorney, Agent, or Firm* — Foley & Lardner LLP (57) ABSTRACT

Aspects are directed to formal verification of computer instructions. A system may present, at a user interface, a first model including one or more instructions, the first model corresponding to a data structure that corresponds to the instructions in the first model, obtain, via the user interface and during a first traversal of the data structure, a first indication to modify to a predetermined value an unmodified parameter of an instruction among the instructions, and present, at the user interface in response to the indication to modify the unmodified parameter, a second indication of execution of one or more of the instructions in an order according to a second model that corresponds to the data structure and based on a modified parameter.

20 Claims, 9 Drawing Sheets

USER INTERFACE FOR FORMAL VERIFICATION OF COMPUTER INSTRUCTIONS FOR COMPATIBILITY WITH A COMPILER ARCHITECTURE

TECHNICAL FIELD

The present implementations relate generally to compiler systems, and more particularly to formal verification of computer instructions for compatibility with a compiler architecture.

BACKGROUND

Electronic system are increasingly expected to operate in increasingly complex environments and with respect to increasingly stringent performance demands. Software development platforms are increasingly expected to effectively evaluate and vet computer architectures for any flaws or inefficiencies. However, conventional system lack input-output architectures to generate user output of a running architecture evaluation process or to receive input from a user to modify a running architecture evaluation process. A user can thus not provide meaningful refinement of an architecture during the evaluation, which can introduce significant delays into architecture development.

SUMMARY

Aspects of this technical solution are directed to a user interface to indicate a state of execution of operation of a verification process of instructions in various programming languages, and to modify execution of the verification process by a user interface during execution of the verification process. This technical solution may include a user interface compatible with an integrated development environment (IDE) of a compiler, and compatible with a model corresponding to a set of instructions. A model may correspond to a formal verification model based on an instruction set in a programming language. The technical solution may support run-time visualization of the state of execution of the model, including user interface indications that may change during runtime in accordance with execution of the model. The technical solution may support logic and user interfaces to modify execution of a model during run-time by modifying an instruction or parameter of an instruction. The technical solution can include a user interface compatible with an IDE to augment the IDE or provide user interface elements and logic beyond that of an IDE, to provide the technical improvement of run-time tracing and editing of a formal verification model within a programming language editing user interface. Thus, a technological solution for formal verification of computer instructions for compatibility with a compiler architecture is provided.

Aspects are directed to a system for formal verification of computer instructions for compatibility with a compiler architecture. The system may include a processor and memory coupled with a user interface. The system may present, at the user interface, a first model that includes a data structure based on one or more instructions compatible with a compiler. The system may obtain, via the user interface and during a first traversal of the data structure, a first indication to modify to a predetermined value an unmodified parameter of an instruction among the instructions. The system may present, at the user interface in response to the indication to modify the unmodified parameter, a second indication of execution of one or more of the instructions in an order according to a second model that corresponds to the data structure and based on a modified parameter.

Aspects are directed to a system for formal verification of computer instructions for compatibility with a compiler architecture. The system may include a processor and memory. The system may generate, by a compiler, a first model that includes a data structure based on one or more instructions compatible with the compiler. The system may modify, by the compiler during a first traversal of the data structure in response to an indication to modify to a predetermined value an unmodified parameter of an instruction among the instructions, the unmodified parameter to a modified parameter. The system may execute, by the compiler in response to the modification of the unmodified parameter, one or more of the instructions in an order according to a second model that corresponds to the data structure and based on the modified parameter.

Aspects are directed to a method for formal verification of computer instructions for compatibility with a compiler architecture. The method may include presenting, at the user interface, a first model may include a data structure based on one or more instructions compatible with a compiler. The method may include presenting, at the user interface, a first indication of execution of one or more of the instructions in an unmodified order according to the first model based on an unmodified parameter of an instruction among the instructions. The method may include obtaining, via the user interface and during a first traversal of the data structure, a second indication to modify to a predetermined value the unmodified parameter. The method may include presenting, at the user interface in response to the second indication to modify the unmodified parameter, a third indication of execution of one or more of the instructions in an order according to a second model may correspond to the data structure and based on a modified parameter.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations may be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but may include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This technical solution may include a user interface presentation to generate one or more indications overlaid onto particular instructions of a programming language. The user interface presentation may include one or more dynamic user interface indications to highlight various instructions or groups of instructions under execution. The technical solution may also optimize presentation of indications during runtime by executing one or more of model verification execution and user interface generation by particular processors including hardware optimized to perform coordinated and latency-free presentation of execution of a model with execution of the model. The coordinated and concurrent execution of a model and presentation of indications of the state of execution of the model may provide technical improvements including run-time modification of verification models. The coordinated and concurrent execution of a model and presentation of indications of the state of execution of the model may provide technical improvements to increase speed of validation of formal verification and reduce compute resources including processor cycles expended to perform a model verification.

Figure 1:
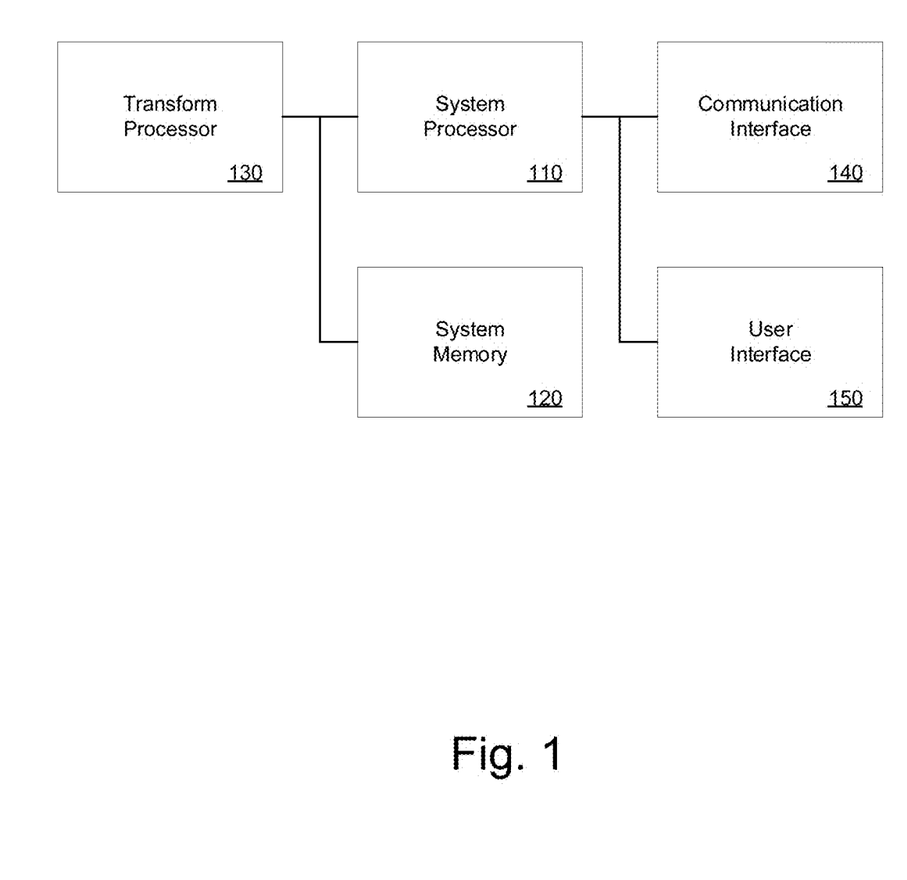
FIG. 1 illustrates a system, according to one or more embodiments.

FIG. 1 illustrates a system in accordance with present implementations. As illustrated by way of example in FIG. 1, an example system 100 may include a system processor 110, a system memory 120, a transform processor 130, a communication interface 140, and a user interface 150.

The system processor 110 may execute one or more instructions associated with the system 100. The system processor 110 may include an electronic processor, an integrated circuit, or the like including one or more of digital logic, analog logic, digital sensors, analog sensors, communication buses, volatile memory, nonvolatile memory, and the like. The system processor 110 may include, but is not limited to, at least one microcontroller unit (MCU), microprocessor unit (MPU), central processing unit (CPU), graphics processing unit (GPU), physics processing unit (PPU), embedded controller (EC), or the like. The system processor 110 may include a memory operable to store or storing one or more instructions for operating components of the system processor 110 and operating components operably coupled to the system processor 110. The one or more instructions may include at least one of firmware, software, hardware, operating systems, embedded operating systems, and the like. The system processor 110 or the system 100 generally may include at least one communication bus controller to effect communication between the system processor 110 and the other elements of the system 100.

The system memory 120 may store data associated with the system 100. The system memory 120 may include one or more hardware memory devices to store binary data, digital data, or the like. The system memory 120 may include one or more electrical components, electronic components, programmable electronic components, reprogrammable electronic components, integrated circuits, semiconductor devices, flip flops, arithmetic units, or the like. The system memory 120 may include at least one of a non-volatile memory device, a solid-state memory device, a flash memory device, and a NAND memory device. The system memory 120 may include one or more addressable memory regions disposed on one or more physical memory arrays. A physical memory array may include a NAND gate array disposed on, for example, at least one of a particular semiconductor device, integrated circuit device, and printed circuit board device.

The transform processor 130 may execute one or more instructions associated with one or more predetermined transformation processes. As one example, transformation processes include Fourier transforms, matrix operations, calculus operations, combinatoric operations, trigonometric operations, geometric operations, encoding operations, decoding operations, compression operations, decompression operations, image processing operations, audio processing operations, and the like. The transform processor 130 may be operable to execute one or more transformation processes in accordance with one or more transformation instruction parameters. In some implementations, transformation instruction parameters include one or more instructions associating the transform processor 130 with one or more predetermined transformation processes. The transform processor 130 may include one or more transformation processes. Alternatively, in some implementations, the transform processor 130 may include a plurality of transform processors 130 associated with various predetermined transformation processes. Alternatively, the transform processor 130 may include a plurality of transformation processing cores each associated with, configured to execute, fabricated to execute, or the like, a predetermined transformation process. The transform processor 130 may be an electronic processor, an integrated circuit, or the like including one or more of digital logic, analog logic, communication buses, volatile memory, nonvolatile memory, and the like. The transform processor 130 may include but is not limited to, at least one graphics processing unit (GPU), physics processing unit (PPU), embedded controller (EC), gate array, programmable gate array (PGA), field-programmable gate array (FPGA), application-specific integrated circuit (ASIC), or the like. Any electrical, electronic, or like devices, or components associated with the transform processor 130 may also be associated with, integrated with, integrable with, supplemented by, complemented by, or the like, the system processor 110 or any component thereof.

Figure 2:
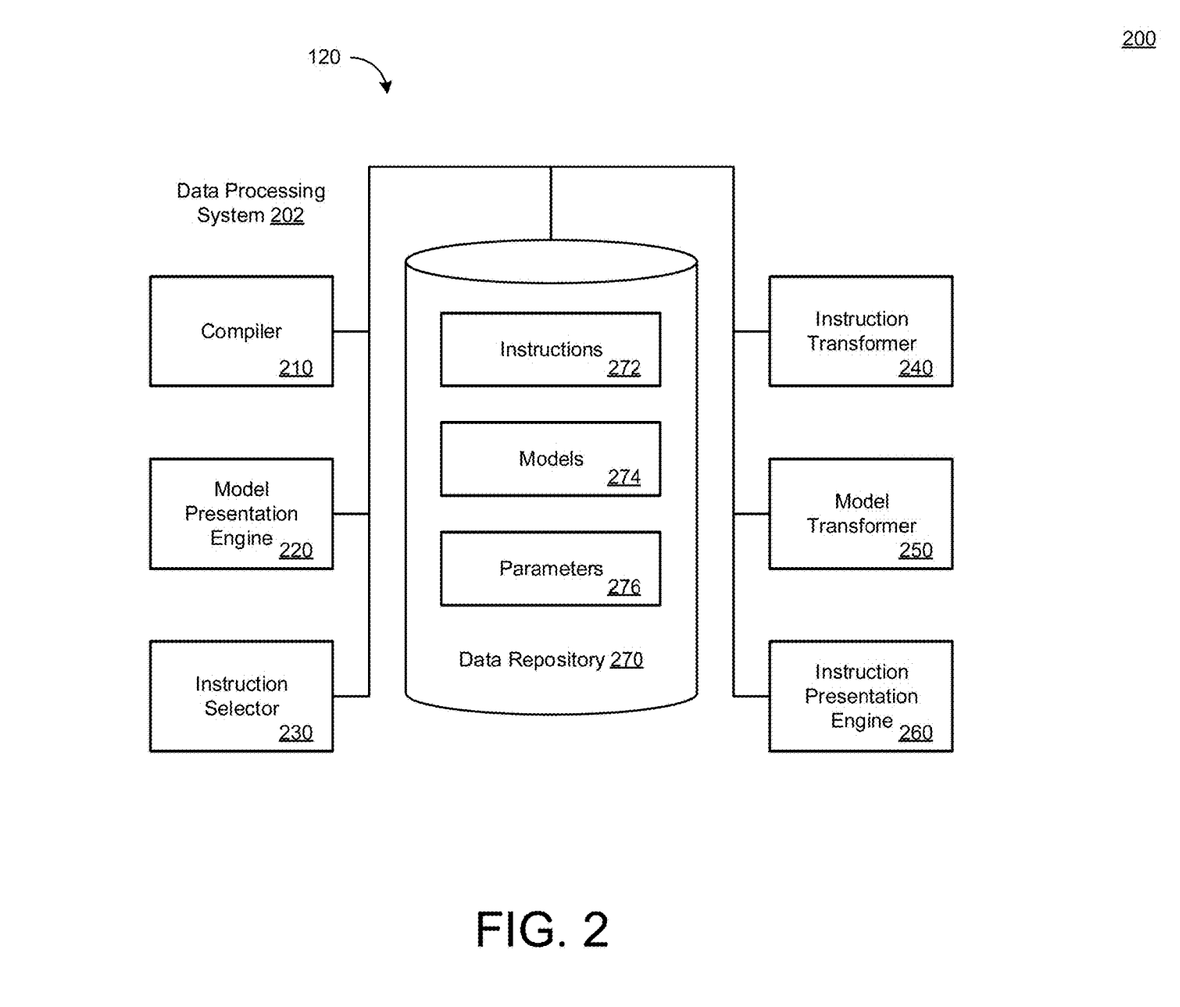
FIG. 2 illustrates a system architecture, according to one or more embodiments.

The transform processor 130 may be associated with one or more predetermined transform processes in accordance with one or more metrics, engines, models, and the like, of the example computing system of FIG. 2. In some implementations, a predetermined transform process of the transform processor 130 is associated with one or more corresponding metrics, engines, models, and the like, of the example computing system of FIG. 2. The transform processor 130 may be configured to centralize, optimize, coordinate, or the like, execution of a transform process across one or more metrics, engines, models, and the like, of the example computing system of FIG. 2. The transform processor may be fabricated to, configured to, or the like, execute a particular transform process with at least one of a minimum physical logic footprint, logic complexity, heat expenditure, heat generation, power consumption, and the like, with respect to at least one metrics, engines, models, and the like, of the example computing system of FIG. 2.

The communication interface 140 may communicatively couple the system processor 110 to an external device. An external device may include, but is not limited to, a smartphone, mobile device, wearable mobile device, tablet computer, desktop computer, laptop computer, cloud server, local server. The communication interface 140 may communicate one or more instructions, signals, conditions, states, or the like between one or more of the system processor 110 and components, devices, blocks operatively coupled or couplable therewith. The communication interface 140 may include one or more digital, analog, or like communication channels, lines, traces, or the like. As one example, the communication interface 140 may include at least one serial or parallel communication line among multiple communication lines of a communication interface. The communication interface 140 may include one or more wireless communication devices, systems, protocols, interfaces, or the like. The communication interface 140 may include one or more logical or electronic devices including but not limited to integrated circuits, logic gates, flip flops, gate arrays, programmable gate arrays, and the like. The communication interface 140 may include one or more telecommunication devices including but not limited to antennas, transceivers, packetizers, and wired interface ports. Any electrical, electronic, or like devices, or components associated with the communication interface 140 may also be associated with, integrated with, integrable with, replaced by, supplemented by, complemented by, or the like, the system processor 110 or any component thereof.

The user interface 150 may generate one or more outputs detectable by a user of the system 100, and may include one or more input devices to detect interaction by a user with the system 100. The user interface may include a display device. The display device may display at least one graphical user interface (GUI), and may include an electronic display. An electronic display may include, for example, a liquid crystal display (LCD), a light-emitting diode (LED) display, an organic light-emitting diode (OLED) display, or the like. The display device may receive, for example, capacitive or resistive touch input. The system may obtain, via the user interface, a selection of an unmodified parameter that corresponds to the instruction. The system may present, at the user interface, a third indication of execution of one or more of the instructions in an unmodified order according to the first model based on the unmodified parameter. The user interface may correspond to an integrated development environment (IDE).

FIG. 2 illustrates a system architecture in accordance with present implementations. As illustrated by way of example in FIG. 2, an example architecture 200 may include a compiler 210, a model presentation engine 220, an instruction selector 230, an instruction transformer 240, a model transformer 250, an instruction presentation engine 260, and a data repository 270. The architecture 200 or any portion thereof may correspond to a data processing system 202.

The compiler 210 may include one or more graphical user interfaces and one or more command line interfaces. The compiler 210 may transform one or more instructions corresponding to a high-level programming language to a machine-readable language. For example, a high-level programming language may include Python or C++. For example, a machine-readable language may include assembly. The compiler 210 may be compatible with the transform processor 130 to convert one or more instructions from high-level programming language to machine-readable programming language. The compiler 210 may be compatible with the transform processor 130 or the system processor 110 to concurrently execute a model based on a high-level programming language and generate a presentation at the instruction presentation engine 260 corresponding to the execution of the model. For example, the compiler 210 may transmit instructions to execute a model to the transform processor 130 and may transmit various instructions to generate a user interface presentation to the system processor 110. The compiler 210 can provide the technical improvement of compatibility with particular processors and execution of compilation of high-level programming language concurrently with contemporaneous or concurrent presentation of the compilation at a user interface.

The model presentation engine 220 may generate a model corresponding to a high-level language. The model may correspond to a formal verification model compatible with the compiler 210 and based on a structure of the high-level language. For example, the model presentation engine 220 may instruct a user interface to present an arrangement of a high-level language according to a sequence of execution of the high-level language. For example, the model presentation engine 220 may generate a visual presentation of a stack including one or more functions or variables identified by the compiler 210 in response to a compilation process of the high-level language.

The instruction selector 230 may identify one or more instructions of a high-level language as presented at as user interface. The instruction selector 230 may communicate with the compiler 210 or the model presentation engine 220 to obtain one or more instructions of a high-level language or objects of the model corresponding to those instructions. The instruction selector 230 may identify an instruction address, instruction identifiers, or range thereof, in response to receiving a selection via a user interface of one or more instructions of the high-level language. The instruction selector 230 may be compatible with the compiler 210 to capture user interface input to select instructions or objects from the compiler 210 distinct from input provided to the compiler to edit high-level language or perform compilation.

The instruction transformer 240 may modify an instruction or parameter of a high-level language in response to receiving a selection of that instruction or an instruction linked with a particular parameter. The instruction transformer 240 may modify a parameter to a particular predetermined value. A predetermined value can include a constant value or subset of values compatible with the parameter. For example, the instruction transformer 240 may identify a Boolean parameter input to a selected instruction, and can convert that Boolean parameter to a Boolean constant having the value TRUE. Thus, the instruction transformer 240 may transform an instruction or a parameter of an instruction for a variable to a constant. The instruction transformer 240 may modify the instruction during execution of a model corresponding to the instructions and the parameter. Thus, the instruction transformer 240 may modify instructions and parameters defined at compile-time, during execution of those instructions or execution of a model corresponding to those instructions.

The model transformer 250 may modify a model corresponding to a high-level language in response to a modification of an instruction or a parameter corresponding to the model. For example, the model transformer 250 may modify a model including multiple branches based on multiple values of a parameter of an instruction, to eliminate traversal of or eliminate a portion of the model corresponding to one or more branches. For example, the model transformer 250 may eliminate a branch executable in response to a parameter having a FALSE value, in response to a modification by the instruction transformer 240 to modify a parameter of that instruction to a TRUE value. The model transformer 250 may thus prune a model based on a modification of a parameter to block execution or presence of a branch of the model, during execution of those instructions or execution of a model corresponding to those instructions.

The instruction presentation engine 260 may present one or more indications and control affordances based on instructions, parameters, and models corresponding to a high-level language compatible with the compiler 210. The instruction presentation engine 260 may be compatible with the compiler 210 to present an indication of execution of an instruction by the compiler 210 concurrently with execution by the compiler of that instruction. The instruction presentation engine 260 may include an interface to present one or more indications overlaid onto or concurrently with a compiler user interface. For example, the instruction presentation engine 260 may present one or more indications corresponding to execution of an instruction within an integrated development environment (IDE) of the compiler 210. Thus, the instruction presentation engine 260 may provide a technical improvement of providing instruction-level feedback to a user of a compiler or IDE, contemporaneously or concurrently with execution of a model corresponding to those instructions.

The data repository 270 can correspond at least partially to the system memory 120. The data repository 270 may include an instruction storage 272, a model storage 274, and a parameter storage 276. The instruction storage 272 may include one or more instructions corresponding to one or more high-level languages. The model storage 274 may include one or more models based on various instructions. The system may cause the execution of one or more of the instructions in the order according to the second model. The system may execute, by the compiler, the execution of one or more of the instructions in the order according to the second model. The parameter storage 276 may include identifiers of one or more parameters, identifiers of one or more types of identifiers. The system may cause, in response to the indication to modify the unmodified parameter, a compiler to block execution of one or more of the instructions according to the first model. The unmodified parameter may correspond to the instruction. The system may execute, by the compiler, of one or more of the instructions in an unmodified order according to the first model based on the unmodified parameter. The system may block, by the compiler in response to the modification of the unmodified parameter, execution of one or more of the instructions according to the first model.

Figure 3:
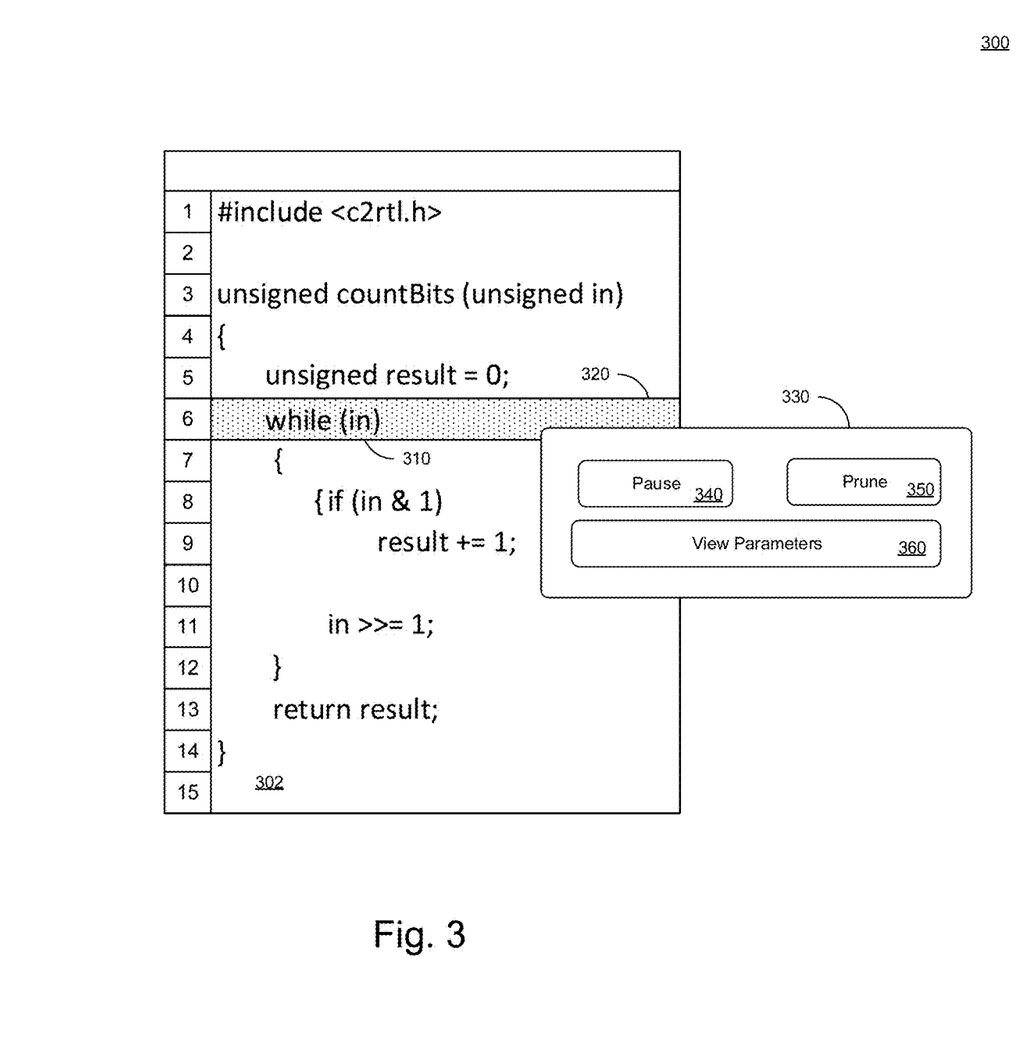
FIG. 3 illustrates a user interface in a first state, according to one or more embodiments.

FIG. 3 illustrates a user interface in a first state, in accordance with present implementations. As illustrated by way of example in FIG. 3, an example user interface 300 can include an IDE presentation 302 including a plurality of instructions, a high-level instruction 310 among the plurality of instructions, a cursor indication 320, and a control presentation 330.

The IDE presentation 302 may present a visual representation of one or more instructions of a high-level programming language. The IDE presentation 302 may be compatible with and presented concurrently with one or more control affordances and indications that provide input to and output from a model executing based on the instructions presented at the IDE presentation 302. The IDE presentation 302 may provide the technical improvement of providing responsive input and output to modify or trace the execution of a model corresponding to the instructions displayed at the IDE presentation 302, during execution of the model. Thus, the IDE presentation 302 may be operable to modify content of instructions, parameters, or models during execution by a compiler of the instructions, parameters, or models.

The high-level instruction 310 may correspond to an instruction executable by the compiler 210 or executable by the compiler 210. For example, the high-level instruction 310 may correspond to a loop during which execution of the model may not advance. For example, the high-level instruction 310 may correspond to a while loop based on a parameter that does not change to value causing an exit condition from the while loop within a predetermined time period. For example, the while loop may include a complex set of instructions that may appear to cause the model to pause while execution against objects that represent the while loop or the content thereof. The model, for example, can correspond to a formal verification model that can be executed to determine compatibility with the compiler 210 or an execution criterion based on the compiler 210. The formal verification model can be based on the high-level language and can be distinct from machine-readable language corresponding to the compiled high-level language. Thus, the IDE presentation 302 may present operation directed to formal verification as an overlay of an IDE corresponding to a compiler.

The cursor indication 320 may include a visual annotation corresponding to a particular instruction under execution in accordance with a model. For example, the cursor indication 320 may highlight a row in a predetermined color or pattern to indicate that a particular instruction is under execution, or a particular object of a model correspond to a particular instruction is under execution. The cursor indication 320 may be modifiable in one or more of color, brightness, rate of change, pattern, or any combination thereof. For example, the cursor indication 320 may have a first blue color in response to execution at an instruction lasting below 5 seconds. For example, the cursor indication 320 may have a second red color in response to execution at an instruction lasting over 5 seconds. The particular colors and times may vary, and are not limited to the indicated example.

The control presentation 330 may provide an interface to modify a model corresponding to the instructions presented at the IDE presentation and to modify indications corresponding to the instructions presented at the IDE presentation. For example, the control presentation 330 may include one or more control affordances operable to modify one or more instructions corresponding to a model or any component of the model or the corresponding instructions. The control presentation 330 may present values or indications corresponding to values of particular parameters during execution of the model. The control presentation 330 can include a pause control affordance 340, a prune control affordance 350, and a view parameters control affordance 360.

The pause control affordance 340 may stop execution of a model corresponding to the instructions presented at the IDE presentation at a particular point in an order of execution of the instructions. For example, the compiler can generate a model based on the instructions including a hierarchical structures corresponding to an execution stack. The execution stack may model a path of execution of the instructions across a plurality of nested operations, instructions, or collections thereof. The order can correspond to a sequential order of operation of code in accordance with a flow of a sequence of high-level language instructions corresponding to the sequence of instructions presented at the IDE presentation 302. The pause control affordance 340 may be activated at a particular point in time corresponding to a particular instruction, to stop execution of the model at that instruction. The pause control affordance 340 may be deactivated at a particular point in time corresponding to a particular instruction, to resume execution of the model at that instruction. Changes in indication 320 can correspond to activation or deactivation of the pause control affordance 340. For example, the pause control affordance 340 may cause the indication 320 to change to a yellow color to indicate a pause state at execution of the model at a particular instruction 310.

The prune control affordance 350 may stop execution of a portion of a model corresponding to a portion of the instructions presented at the IDE presentation at a particular point in an order of execution of the instructions. The prune control affordance 350 may be activated at a particular instruction, to stop execution of that instruction and continuing execution of the model. The prune control affordance 350 may be deactivated at a particular instruction, to resume execution of that instruction of the model at. Changes in indication 320 can correspond to activation or deactivation of the prune control affordance 350. For example, the prune control affordance 350 may cause the indication 320 to change to a purple color to indicate a prune state at instruction 310 during execution of the model. For example, the prune state can be activated while the indication 320 indicates execution of the while loop at instruction 310. In response, the model execution can continue past the instruction 310 and any instructions within that while loop. The view parameters control affordance 360 may activate a parameter presentation upon activation.

Figure 4:
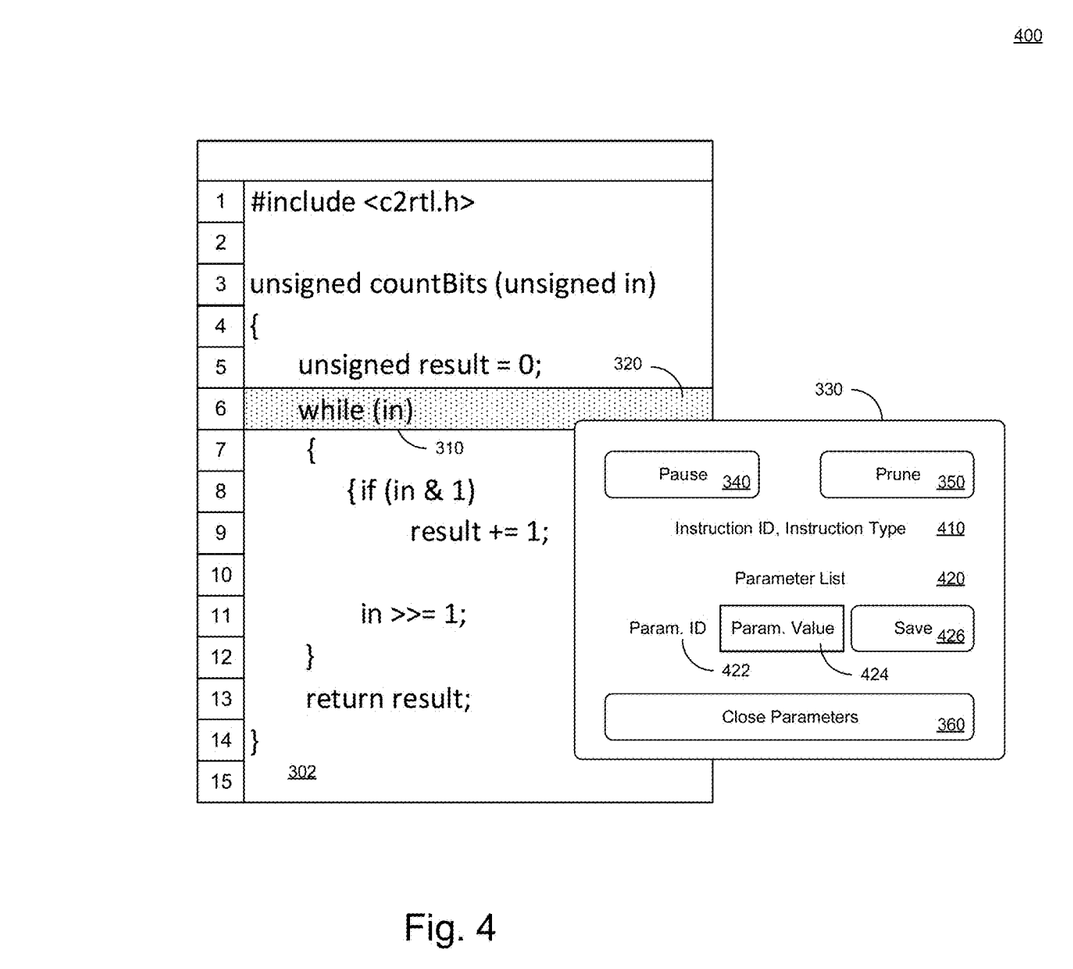
FIG. 4 illustrates a user interface in a second state, according to one or more embodiments.

FIG. 4 illustrates a user interface in a second state, in accordance with present implementations. As illustrated by way of example in FIG. 4, an example user interface 400 can include the IDE presentation 302, the high-level instruction 310, the cursor indication 320, the control presentation 330, an instruction presentation 410, and a parameter presentation 420.

The instruction presentation 410 may present one or more characteristics corresponding to the instruction 310 linked with the indication 320. For example, the instruction presentation 410 may present an identifier or name of the instruction 310, and can present a type of the instruction 310. A type can correspond, for example, to a return value, to one or more parameters that the instruction can accept, or a class of operation of the instruction. A class of operation can include, for example, an arithmetic or conditional instruction.

The parameter presentation 420 may present one or more characteristics corresponding to a parameter of the instruction 310 linked with the indication 320. For example, the parameter presentation 420 may present an identifier or name of the parameter, and can present a type of the parameter. A type can correspond, for example, to a variable type. A variable type can include, for example, a Boolean or integer. The parameter presentation 420 may include a parameter identifier presentation 422, a parameter control affordance 424, and a parameter modification control affordance 426. The parameter identifier presentation 422 may present a characteristic of the parameter corresponding to instruction 310.

The parameter control affordance 424 may provide an input to modify to a predetermined value a parameter corresponding to the instruction 310. For example, the parameter control affordance 424 may include a text input field or an election menu to select a particular value for a particular parameter compatible with that parameter. For example, a parameter corresponding to the variable IN can have a Boolean type, and the parameter control affordance 424 may provide an input to select one of a TRUE and FALSE value for the parameter. The parameter modification control affordance 426 can modify the parameter in accordance with a selection of the parameter control affordance 424. For example, the parameter modification control affordance 426 may include a save operation to transform the parameter from a variable value to a constant value, during execution of a model including an object corresponding to the parameter. The model can in response be modified to execute or continue execution with a constant Boolean value for that parameter.

Figure 5:
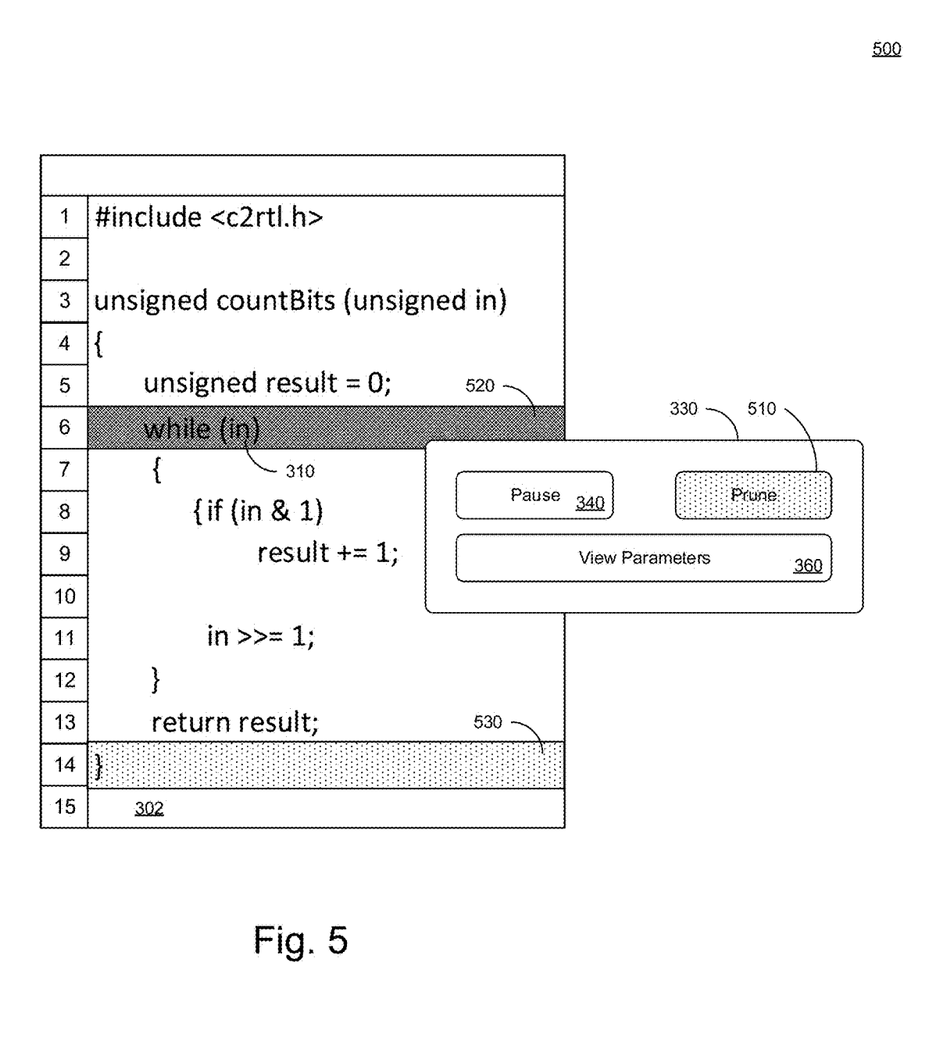
FIG. 5 illustrates a user interface in a third state, according to one or more embodiments.

FIG. 5 illustrates a user interface in a third state, in accordance with present implementations. As illustrated by way of example in FIG. 5, an example user interface 500 can include the control presentation 330, the prune control affordance 350 in an activated state 510, a prune indication 520, and a cursor indication 530.

The prune control affordance in an activated state 510 may cause the user interface 500 to generate one or more indications at the IDE presentation 302, or to modify one or more presentations at the IDE presentation 302. For example, the prune control affordance 350 in the activated state 510 may cause the IDE presentation 302 to include the prune indication 520. For example, the prune control affordance 350 in the activated state 510 may cause the IDE presentation 302 to modify or add the prune indication 520 or the cursor indication 530 during execution of a model corresponding to the instructions presented at the IDE presentation 302.

The prune indication 520 may include a visual annotation corresponding to a particular instruction under execution in accordance with a model that may have a property distinct from one or more of the cursor indication 320 or 530. For example, the prune indication 520 may highlight a row in a predetermined color or pattern to indicate that a particular instruction is blocked from execution, or a particular object of a model correspond to a particular instruction is blocked from execution. The prune indication 520 may be modifiable in one or more of color, brightness, rate of change, pattern, or any combination thereof. For example, the prune indication 520 may have a purple color in response to the activated state 510. The particular colors may vary, and are not limited to the indicated example.

The cursor indication 530 may include a visual annotation corresponding to a particular instruction under execution in accordance with a model. For example, the cursor indication 530 may highlight a row in a predetermined color or pattern to indicate that a particular instruction is under execution, or a particular object of a model correspond to a particular instruction is under execution. The cursor indication 530 may be modifiable in one or more of color, brightness, rate of change, pattern, or any combination thereof, and can correspond in at least one characteristic to the cursor indication 320. For example, the cursor indication 530 may indicate a position corresponding to a last high-level instruction of a plurality of instructions. For example, the cursor indication 530 can indicate that execution of a model corresponding to a plurality of instructions has advanced past a while loop corresponding to the prune indication 520. Thus, this technical solution may provide a technical improvement to a user interface including at least presenting a plurality of distinct indications during execution of a model corresponding to the instructions presented at the IDE presentation 302. This technical solution may provide a technical improvement to a user interface including at least presenting a plurality of distinct indications corresponding to multiple states of execution of a model corresponding to high-level instructions on a per-instruction basis, including execution, blocking.

Figure 6:
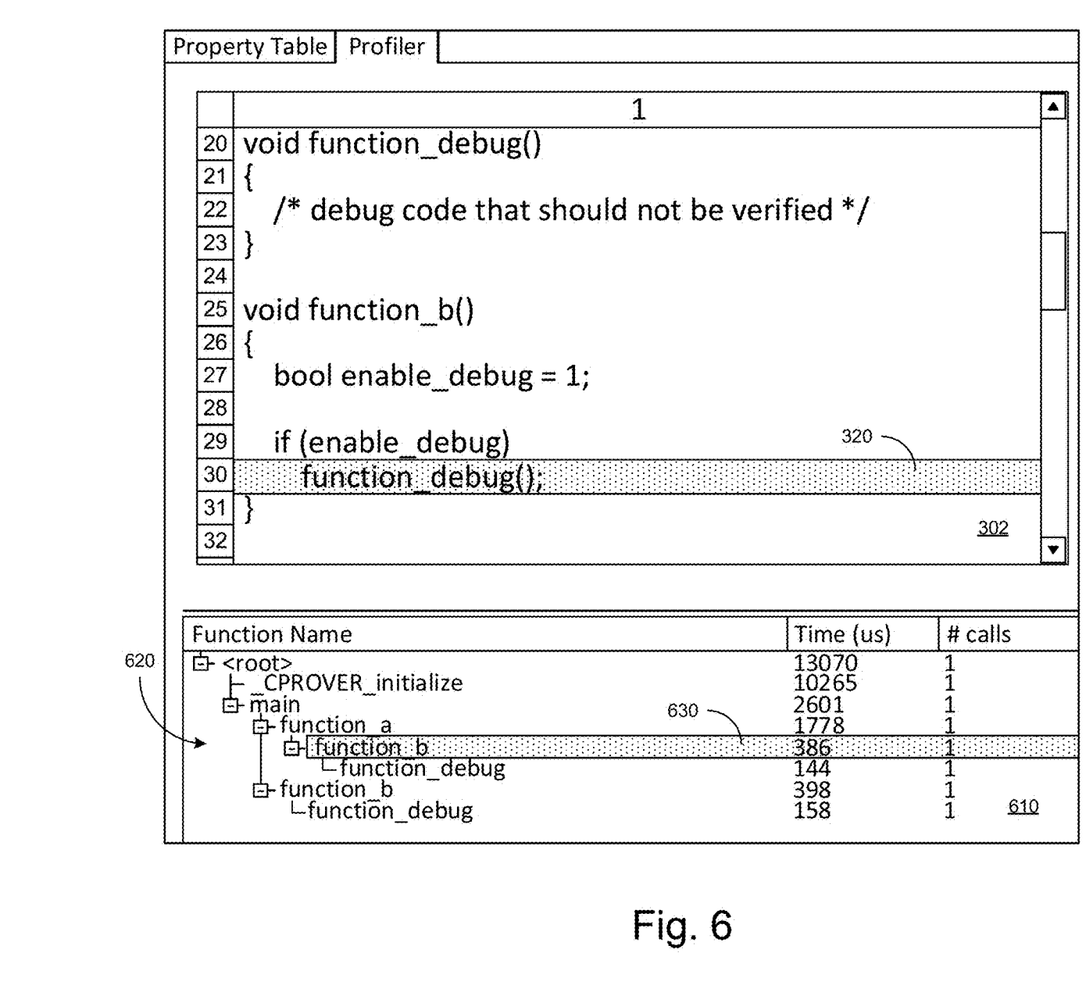
FIG. 6 illustrates a user interface in a fourth state, according to one or more embodiments.

FIG. 6 illustrates a user interface in a fourth state, in accordance with present implementations. As illustrated by way of example in FIG. 6, an example user interface 600 can include the IDE presentation 302, the cursor indication 530, a stack presentation 610, a hierarchy presentation 620, and a stack indication 630.

The stack presentation 610 may present a visual representation of one or more instructions of a high-level programming language. The stack presentation 610 may be compatible with and be presented concurrently with the IDE presentation 302. The stack presentation 610 may include a region distinct from the IDE presentation of the user interface 600. The stack presentation 610 may provide the technical improvement of providing responsive input and output to modify or trace the execution of a model corresponding to the instructions displayed at the stack presentation 610, during execution of the model. The stack presentation 610 can include various metrics associated with the execution of the model, including time to execute particular instructions or groups of instructions or function, and the number of calls to particular instructions. For example, the stack presentation can update a time metric or a call metric during execution of the model corresponding to the stack presentation 610. Thus, the stack presentation 610 may be responsive to modifications of instructions, parameters, or models during execution by a compiler of the instructions, parameters, or models.

The hierarchy presentation 620 may present a structure corresponding to execution of one or more instructions presented at the IDE presentation 302. For example, a structure of the hierarchy presentation 620 can correspond to an execution stack that indicates an order of past or future execution of one or more instructions corresponding to a model. For example, the model can correspond to a formal verification model.

The stack indication 630 may include a visual annotation corresponding to a particular instruction under execution in accordance with a model. For example, the stack indication 630 may highlight a row in a predetermined color or pattern to indicate that a particular instruction is under execution, or a particular object of a model correspond to a particular instruction is under execution. The stack indication 630 may be modifiable in one or more of color, brightness, rate of change, pattern, or any combination thereof, and can correspond in at least one characteristic to the cursor indication 320. For example, the stack indication 630 may indicate a position corresponding to a last high-level instruction of a plurality of instructions. For example, the stack indication 630 can indicate that execution of a model corresponding to a plurality of instructions has advanced to a particular function within the hierarchy presentation 620. Thus, this technical solution may provide a technical improvement to a user interface including at least presenting a plurality of distinct indications during execution of a model corresponding to the instructions presented at the IDE presentation 302. This technical solution may provide a technical improvement to a user interface including at least presenting a plurality of distinct indications corresponding to both an IDE order and a stack order of instructions correspond to a formal verification model.

Figure 7:
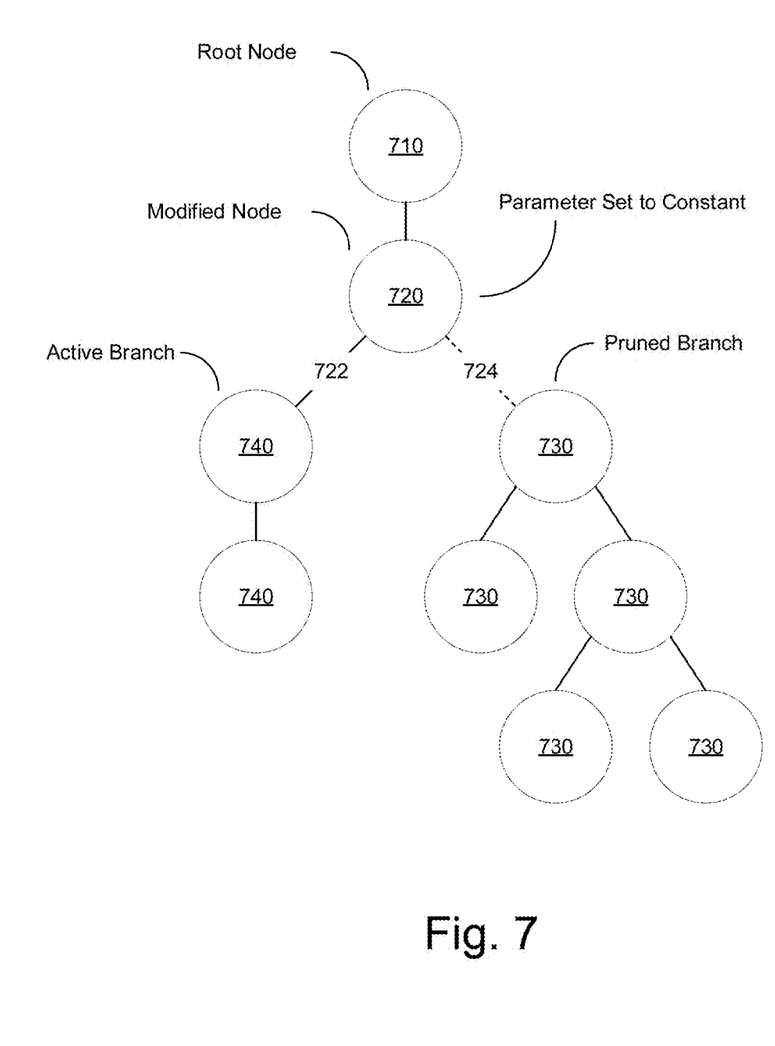
FIG. 7 illustrates a model structure, according to one or more embodiments.

FIG. 7 illustrates a model structure in accordance with present implementations. As illustrated by way of example in FIG. 7, an example model 700 can include a root node 710, a modified node 720, an active edge 722, a pruned edge 724, a pruned branch 730, and an active branch 740. The root node 710 may correspond to a starting or first instruction of a set of instruction corresponding to a model. For example, the root node 710 may include an object of a formal verification model based on an instruction to start a main function of a set of high-level instructions.

The modified node 720 may correspond to an instruction of a set of instructions corresponding to a model executable subsequent to or in response to execution of the root node 710. For example, the modified node 720 may include an object of a formal verification model based on an instruction in a main function of a set of high-level instructions. The modified node 720 can correspond to an instruction having one or more parameters input to the instruction. The parameters of the modified node 720 may have particular types supporting particular values, and may be set or fixed to particular constant values or ranges of constant values compatible with the particular types. For example, the modified node 720 may be based on an instruction having an input parameter of a Boolean type. That Boolean parameter may be modified to a constant TRUE value compatible with the Boolean type. In response to modifying the parameter of the modified node 720, output of the modified node may be modified, and a structure of the model 700 may be modified.

For example, in response to setting the Boolean parameter of the modified node 720 to TRUE, a portion of the model 700 may remain active, and a portion of the model 700 may be pruned, in response to the modification of the parameter of the modified node 720. corresponding to instructions executable in response to a determination by the modified node that the Boolean parameter is TRUE. The active edge 722 may correspond to instructions executable in response to a modification of the Boolean parameter of the modified node to TRUE. The pruned edge 724 may correspond to instructions blocked or prevented from execution in response to a modification of the Boolean parameter of the modified node to TRUE. The pruned branch 730 may correspond to an instruction of a set of instructions corresponding to a model executable subsequent to or in response to execution of the modified node 720, and blocked or prevented from execution by the model 700 in response to a modification of the Boolean parameter of the modified node to TRUE. The active branch 740 may correspond to an instruction of a set of instructions corresponding to a model executable subsequent to or in response to execution of the modified node 720, and executable by the model 700 in response to a modification of the Boolean parameter of the modified node to TRUE.

The model can correspond to a data structure having, for example, a tree structure. The data structure may be compatible with a verification model to validate the instructions based on a high-level programming language. The data structure may include one or more objects that may each correspond to corresponding ones of the instructions in the first model. The data structure may include one or more of the objects in the second model, the objects in the second model may each correspond to a subset of the corresponding ones of the instructions in the first model. The data structure may be compatible with a verification model to validate the instructions based on a high-level programming language. The data structure may include one or more objects that each correspond to may correspond ones of the instructions in the first model. The data structure may include one or more of the objects in the second model, the objects in the second model each correspond to a subset of the may correspond ones of the instructions in the first model.

Figure 8:
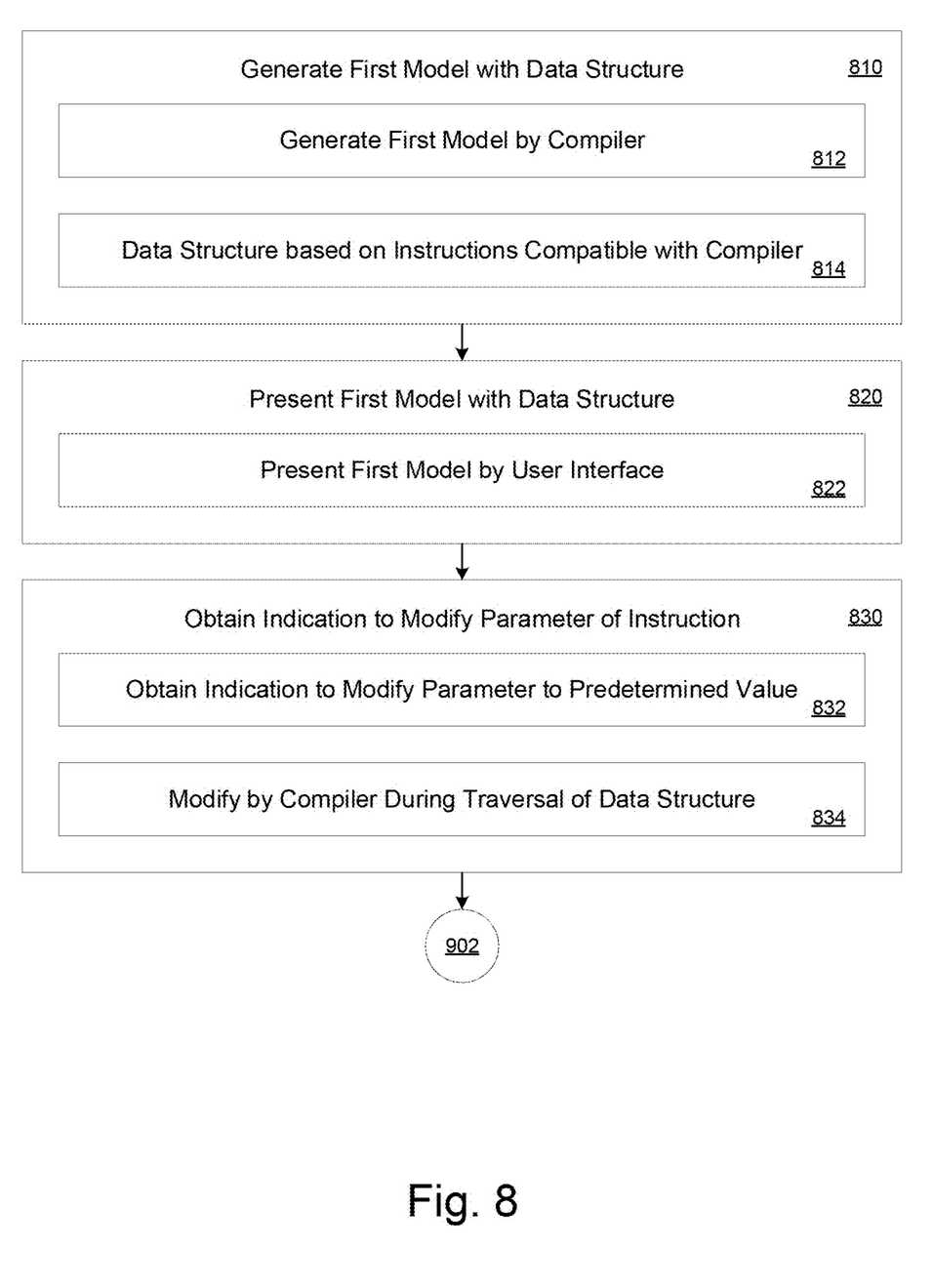
FIG. 8 illustrates a method of formal verification of computer instructions for compatibility with a compiler architecture, according to one or more embodiments.

FIG. 8 illustrates a method of formal verification of computer instructions for compatibility with a compiler architecture, in accordance with present implementations. At least one of the system 100, the architecture 200, and the user interfaces 300-600 can perform method 800 according to present implementations. The method 800 can begin at operation 810.

At operation 810, the method 800 can generate a first model corresponding to a data structure. Operation 800 can include at least one of operation 812 and operation 814. At operation 812, the method 800 can generate a first model by a compiler. At operation 814, the method 800 can generate a first model corresponding to a data structure based on instructions compatible with a compiler. The method 800 can then continue to operation 820.

At operation 820, the method 800 can present a first model corresponding to a data structure. Operation 820 can include operation 822. At operation 822, the method 800 can present a first model by a user interface. The method 800 can then continue to operation 830. For example, the method may include presenting, at the user interface, a third indication of execution of one or more of the instructions in an unmodified order according to the first model based on the unmodified parameter. For example, the third indication can correspond to a state of the model or execution of the model prior to or absent modification of any parameter or particular parameter.

At operation 830, the method 800 can obtain an indication to modify a parameter of an instruction. For example, the method may include obtaining, via the user interface, a selection of the unmodified parameter that corresponds to the instruction. Operation 830 can include at least one of operation 832 and operation 834. At operation 832, the method 800 can obtain an indication to modify a parameter to a predetermined value. At operation 834, the method 800 can modify a parameter or an instruction by a compiler during traversal of a data structure. The method 800 can then continue to operation 902.

Figure 9:
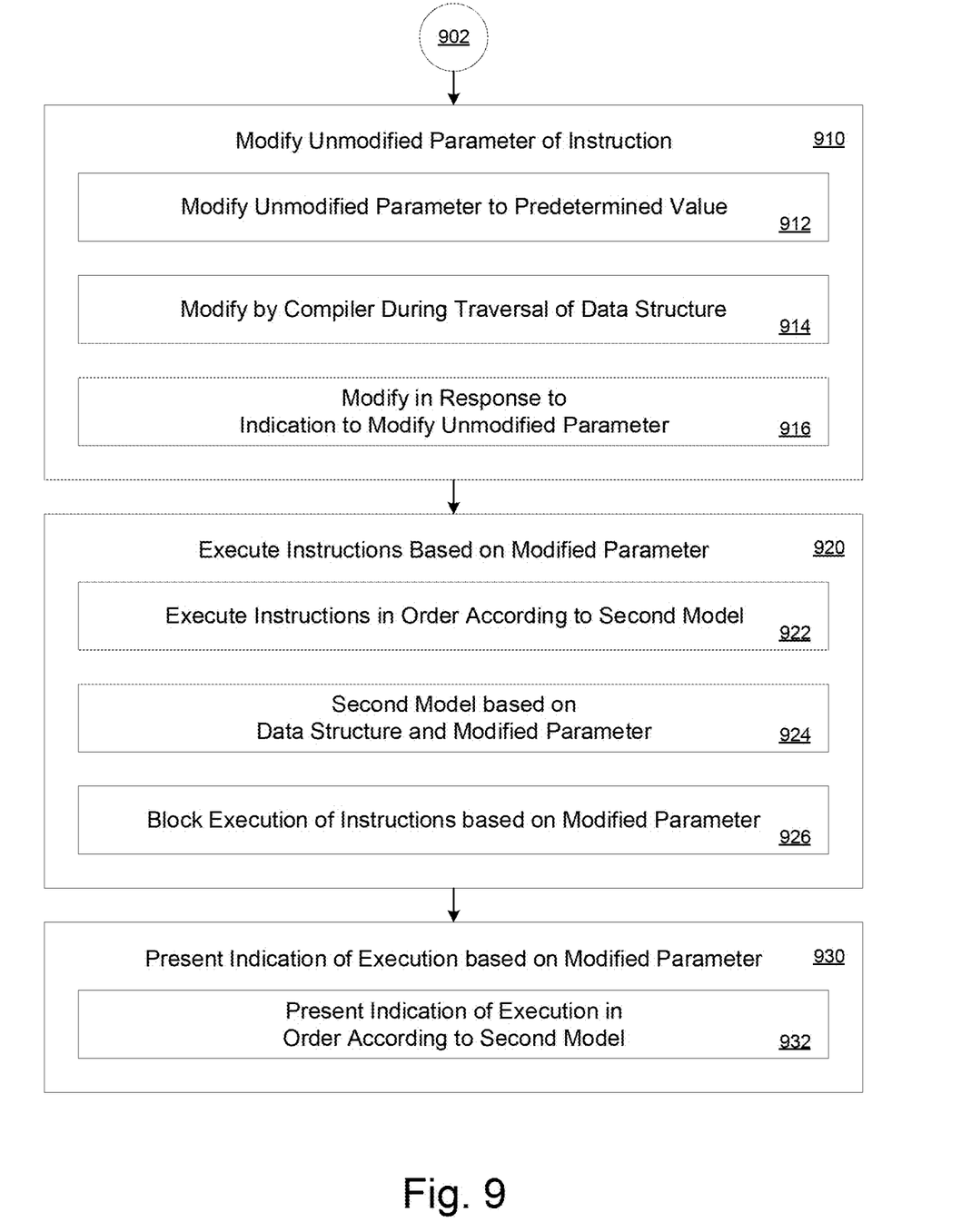
FIG. 9 illustrates a method of formal verification of computer instructions for compatibility with a compiler architecture, further to the method of FIG. 8, according to one or more embodiments.

FIG. 9 illustrates a method of formal verification of computer instructions for compatibility with a compiler architecture, further to the method of FIG. 8. At least one of the system 100, the architecture 200, and the user interfaces 300-600 can perform method 900 according to present implementations. The method 900 can begin at operation 902. The method 900 can then continue to operation 910.

At operation 910, the method 900 can modify an unmodified parameter of an instruction. Operation 910 can include at least one of operation 912, operation 914, and operation 916. At operation 912, the method 900 can modify an unmodified parameter to a predetermined value. At operation 914, the method 900 can modify an unmodified parameter by a compiler during traversal of a data structure. At operation 916, the method 900 can modify an unmodified parameter in response to an indication to modify the unmodified parameter. The method 900 can then continue to operation 920.

At operation 920, the method 900 can execute one or more instructions based on a modified parameter. For example, the method may include causing a compiler to execute of one or more of the instructions in the order according to the second model. For example, a second model can correspond to a formal verification model having a particular parameter of a particular instruction set to a particular constant value or range of values. Operation 920 can include at least one of operation 922, operation 924, and operation 926. At operation 922, the method 900 can execute one or more instructions in an order according to a second model. For example, an order can correspond to an execution order in accordance with a high-level language execution flow. At operation 924, the method 900 can execute according to a second model based on a data structure and a modified parameter. At operation 926, the method 900 can block execution of instructions based on a modified parameter. For example, blocking execution can correspond to preventing execution of one or more instruction that dependent on a particular constant state of a particular parameter. The method 900 can then continue to operation 926.

At operation 930, the method 900 can present an indication of execution based on a modified parameter. For example, the method 900 can present one or more indications concurrently during execution of a model corresponding to a plurality of high-level instructions. operation 930 can include operation 932. At operation 932, the method 900 can present an indication of execution in an order according to a second model. For example, the order can correspond to an execution order, a stack order, any combination thereof, or both concurrently.

The herein described subject matter sometimes illustrates different components contained within, or connected with, different other components. It is to be understood that such depicted architectures are illustrative, and that in fact many other architectures may be implemented which achieve the same functionality. In a conceptual sense, any model of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected," or "operably coupled," to each other to achieve the desired functionality, and any two components capable of being so associated may also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system for formal verification of computer instructions, the system comprising:
a processor and memory coupled with a user interface, the processor configured to:
present, at the user interface, a first model that includes a data structure as generated by a compiler based on one or more instructions compatible with the compiler;
obtain, via the user interface and during a first traversal of the data structure, a first indication to modify an unmodified parameter of an instruction among the one or more instructions to a predetermined value; and
present, at the user interface in response to the indication to modify the unmodified parameter as generated by the compiler, a second indication of execution of the one or more of the instructions in an order according to a second model that corresponds to the data structure as generated by the compiler and based on a modified parameter.

2. The system of claim 1, the processor configured to:
obtain, via the user interface, a selection of the unmodified parameter that corresponds to the instruction.

3. The system of claim 1, the processor configured to:
present, at the user interface, a third indication of execution of one or more of the instructions in an unmodified order according to the first model based on the unmodified parameter.

4. The system of claim 1, the processor configured to:
cause the execution of one or more of the instructions in the order according to the second model.

5. The system of claim 4, the processor configured to:
cause, in response to the indication to modify the unmodified parameter, the compiler to block execution of one or more of the instructions according to the first model.

6. The system of claim 1, the data structure compatible with a verification model to validate the instructions based on a high-level programming language.

7. The system of claim 1, the data structure including one or more objects that each correspond to corresponding ones of the instructions in the first model.

8. The system of claim 7, the data structure including one or more of the objects in the second model, the objects in the second model each correspond to a subset of the corresponding ones of the instructions in the first model.

9. The system of claim 1, the user interface corresponding to an integrated development environment (IDE).

10. A system for formal verification of computer instructions, the system comprising:
a processor and memory, the processor configured to:
generate, by a compiler, a first model that includes a data structure based on one or more instructions compatible with the compiler;
modify, by the compiler during a first traversal of the data structure in response to an indication to modify to an unmodified parameter of an instruction among the one or more instructions to a predetermined value, the unmodified parameter to a modified parameter; and execute, by the compiler in response to the modification of the unmodified parameter as generated by the compiler, one or more of the instructions in an order according to a second model as generated by the compiler that corresponds to the data structure and based on the modified parameter.

11. The system of claim 10, the unmodified parameter corresponding to the instruction.

12. The system of claim 10, the processor configured to:
execute, by the compiler, one or more of the instructions in an unmodified order according to the first model based on the unmodified parameter.

13. The system of claim 10, wherein to modify the unmodified parameter to the modified parameter, the processor is configured to:
transform the unmodified parameter from a variable value to a constant value compatible with a type of the parameter.

14. The system of claim 10, the processor configured to:
block, by the compiler in response to the modification of the unmodified parameter, execution of one or more of the instructions according to the first model.

15. The system of claim 10, the data structure compatible with a verification model to validate the instructions based on a high-level programming language.

16. The system of claim 10, the data structure including one or more objects that each correspond to corresponding ones of the instructions in the first model.

17. The system of claim 16, the data structure including one or more of the objects in the second model, the objects in the second model each correspond to a subset of the corresponding ones of the instructions in the first model.

18. A method for formal verification of computer instructions, the method comprising:
presenting, at a user interface, a first model as generated by a compiler including a data structure based on one or more instructions compatible with the compiler;
presenting, at the user interface, a first indication of execution of one or more of the instructions in an unmodified order according to the first model based on an unmodified parameter of an instruction among the one or more instructions;
obtaining, via the user interface and during a first traversal of the data structure, a second indication to modify the unmodified parameter to a predetermined value; and
presenting, at the user interface in response to the second indication to modify the unmodified parameter as generated by the compiler, a third indication of execution of one or more of the instructions in an order according to a second model as generated by the compiler corresponding to the data structure and based on a modified parameter.

19. The method of claim 18, further comprising:
obtaining, via the user interface, a selection of the unmodified parameter that corresponds to the instruction; and
causing a compiler to execute one or more of the instructions in the order according to the second model.

20. The method of claim 18, further comprising:
presenting, at the user interface, a third indication of execution of one or more of the instructions in an unmodified order according to the first model based on the unmodified parameter.

* * * * *